June 4, 1940.  A. S. HARTANOV  2,202,951
TREATMENT OF BEEF CARCASSES
Filed Dec. 31, 1938

ATTEST -

Andrew S. Hartanov
INVENTOR
BY
ATTORNEY

Patented June 4, 1940

2,202,951

UNITED STATES PATENT OFFICE 2,202,951

TREATMENT OF BEEF CARCASSES

Andrew S. Hartanov, Chicago, Ill., assignor to Industrial Patents Corporation, Chicago, Ill., a corporation of Delaware Application December 31, 1938, Serial No. 248,733

4 Claims. (Cl. 99—174)

A recent important development in the field of the treatment of carcass meat is known in the trade as the Saniseal process. This process is exemplified by the Williams and Cadwell Patents Nos. 2,076,053 and 2,117,125, and by such copending applications for patent of Williams and Cadwell as the application entitled "Treatment of beef carcasses," Serial No. 241,710, filed November 21, 1938.

Attention is called to the Williams Patent No. 2,083,765 which relates to the branding of edible carcasses. The present invention is concerned with an improvement in the Williams branding method there described and claimed as carried out in connection with the Saniseal process applied to beef carcasses.

A side of beef treated in accordance with the present invention is depicted in the drawing.

Figures 1, 2, 3:
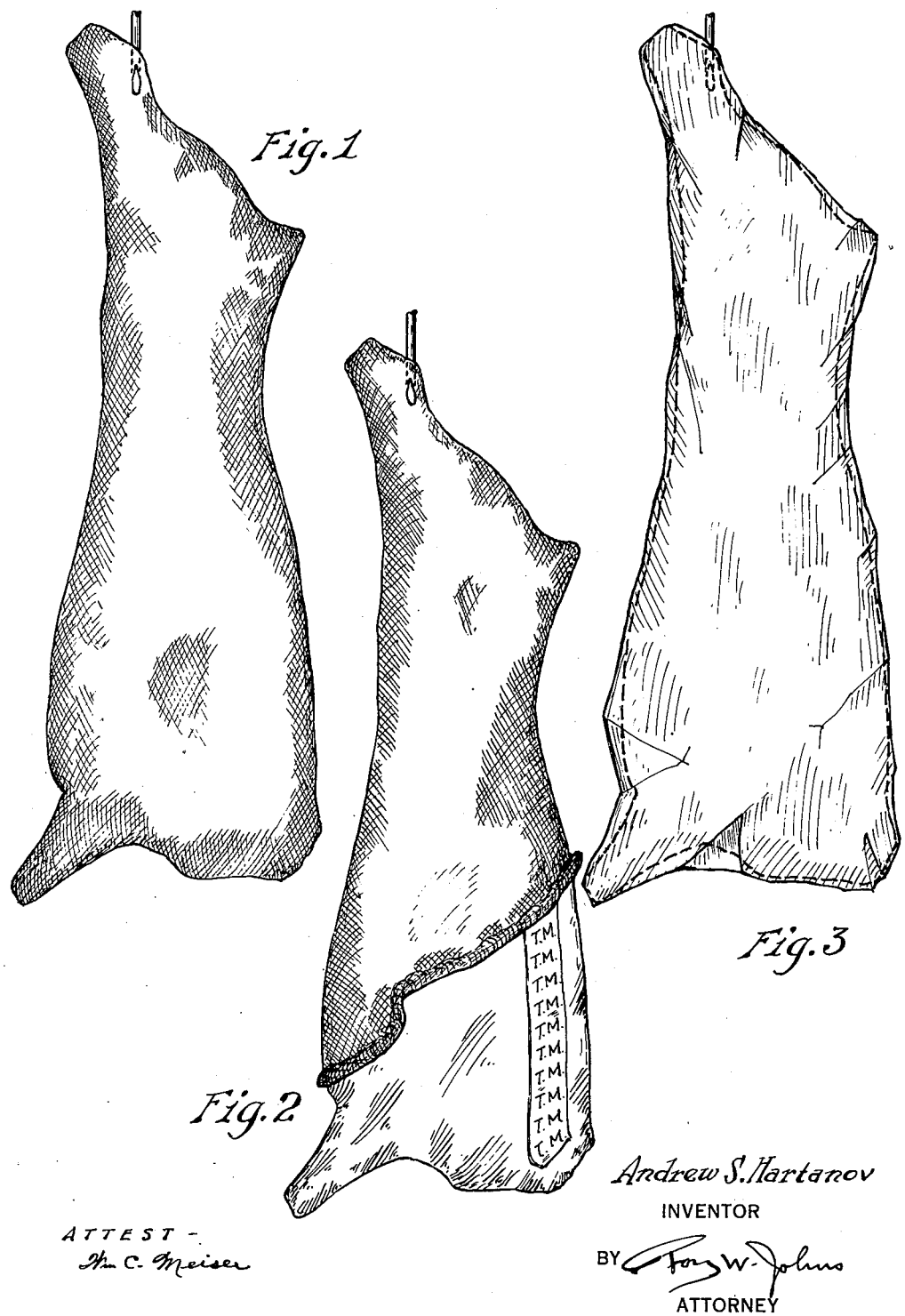
Figure 1 is a side view of a side of beef covered with a cloth.
Figure 2 is a side view of a side of beef to which a strip brand, preferably of transparent cellulose, has been applied which has been covered with a cloth, and the cloth is rolled back to show the strip brand.
Figure 3 is a side view of a side of beef which has been branded and clothed and then covered with a paper bag which is substantially impervious to atmospheric moisture and provides a humidor protective covering for the side of beef.

With the exception of the small areas, the surface of a side of carcass beef is covered with a fatty layer. Upon removal of the hide, small capillaries which nourish the hide are necessarily ruptured, resulting in the formation of blood spots on the surface of the beef side. To secure a white, smooth, fat surface and to eliminate blood spots, it is customary in the preparation of beef for market, to cover the warm side of beef with a salt cloth stretched tightly. After the carcass is thoroughly chilled, this cloth is removed and the side is ready for market. In accordance with the Saniseal process, a warm side of beef or piece of carcass beef is covered with a cloth slightly moistened with salt water which may have a strength of from 5 degrees to 20 degrees salometer. This is followed with the application of a paper bag or other outer covering substantially impervious to atmospheric moisture to secure the humidor effect, and both the outer wrapping and the salt cloth are permitted to remain in place until the beef is ready for subdivision and sale by the retail butcher.

In the Williams Patent No. 2,083,765 it is shown that the optimum surface condition for the application of a transparent cellulose strip brand is found to exist before the gelatinous serum naturally present on the surface of the carcass has been permitted to set up.

In carrying out the present invention on a beef side the skinned surfaces of the beef side are covered with a salt cloth on the killing floor promptly after slaughter and butchering. This cloth is permitted to remain in place for a few hours, during which time the cloth absorbs the blood from the surface capillaries. After the cloth has had an opportunity to remove the blood from the surface capillaries and slightly bleach and smooth the surface of the beef side, it is removed. At this stage the fat surface is partially chilled and has the optimum gelatinous condition which is so important to good adhesion of a transparent cellulose strip brand. A transparent strip cellulose brand or other brand, if desired, is applied as shown in Figure 2 of the drawing, and the beef side then covered with a salt cloth. The clothed beef side may then be sent to the cooler and held for the conventional cooling period. If desired, the beef side may be Sanisealed by the application over the salt cloth of a paper bag or other outer covering substantially impervious to atmospheric moisture.

The present invention provides an improved method of branding beef carcasses. The first cloth not only removes blood spots from the surface of the beef side, but effectually smooths the surface so that the branding strip may be readily and intimately applied to the beef side when it is at its optimum condition, as respects the adhesion power of the gelatinous serum. The second cloth not only is effective in smoothing the fat during the subsequent chilling, but effectually holds the branding strip against the surface of the beef side resulting in effective adhesion without development of wrinkles. It will be seen, therefore, that the first cloth, by smoothing the surface and removing blood spots, prepares the surface for branding, and that the second cloth, in addition to its Saniseal function, acts to press the brand strip in place.

I claim:

1. The method of treating carcass beef which comprises applying a cloth to the skinned surface of the carcass before the carcass has lost its animal heat, retaining the cloth on the surface of the carcass until the cloth has absorbed any blood on the surface of the carcass, and until the surface is partially chilled, removing the cloth, applying a branding material and thereafter covering the branded carcass with a second cloth which has been moistened with a brine solution.

2. The method of treating carcass beef which comprises applying a cloth to the skinned surface of a carcass before the carcass has lost its animal heat, retaining the cloth on the surface of the carcass until the cloth has absorbed any blood on the surface of the carcass, and until the surface is partially chilled, removing the cloth, applying a branding material and thereafter covering the branded carcass with a second cloth.

3. The method of treating beef carcasses which comprises applying a brine soaked cloth to the surface of a beef carcass after the hide has been removed and before the carcass has lost its animal heat, retaining the cloth tightly stretched over the surface until the surface has become partially cooled, removing the cloth, applying a transparent cellulose brand to the partially chilled surface before the gelatinous serum naturally present on the surface has coagulated, and then covering the branded carcass with a second brine moistened cloth.

4. The method of treating beef carcasses which comprises applying a cloth to the surface of a beef carcass after the hide has been removed and before the carcass has lost its animal heat, retaining the cloth tightly stretched over the surface until the surface has become partially cooled, removing the cloth, applying a transparent cellulose brand to the partially chilled surface before the gelatinous serum naturally present on the surface has coagulated, and then covering the branded carcass with a second cloth.

ANDREW S. HARTANOV.